United States Patent [19]

Burgess

[11] Patent Number: 4,482,811

[45] Date of Patent: Nov. 13, 1984

[54] APPARATUS FOR GUIDING CABLE THROUGH A RADIATION CHAMBER WITH REDUCED LEAKAGE THEREFROM

[75] Inventor: Robert G. Burgess, Smithtown, N.Y.

[73] Assignee: Radiation Dynamics, Inc., Melville, N.Y.

[21] Appl. No.: 430,438

[22] Filed: Sep. 30, 1982

[51] Int. Cl.³ .............................................. G21F 7/00
[52] U.S. Cl. .............................. 250/492.3; 250/492.1; 250/515.1; 219/121 EL
[58] Field of Search .................. 250/492.3, 492.1, 400, 250/515.1; 219/121 EL

[56] References Cited

U.S. PATENT DOCUMENTS

| | | | |
|---|---|---|---|
| 3,360,648 | 12/1967 | Cornish et al. | 250/492.3 X |
| 3,482,100 | 12/1969 | Jennrich et al. | 250/515.1 |
| 3,499,141 | 3/1970 | Kingsley et al. | 250/492.3 X |
| 4,226,687 | 9/1980 | Sasaki et al. | 250/492.3 X |

*Primary Examiner*—Janice A. Howell
*Assistant Examiner*—Jack I. Berman
*Attorney, Agent, or Firm*—Howard L. Rose

[57] ABSTRACT

Apparatus for guiding a cable travelling along a longitudinal path through a beam of radiation in a shielded chamber, the apparatus including rollers disposed about the cable in a manner which prevents the leakage of radiation via apertures in the chamber through which the cable enters and exits. Specifically, the apparatus includes sets of rollers spaced at longitudinal intervals along the cable, the rollers in each set being positioned at angular intervals about the longitudinal axis of the cable. An angular offsetting of rollers in different sets, so that a roller in one set is longitudinally aligned with the spacing between rollers in other sets, is provided. By selecting rollers of prescribed dimensions, by placing the rollers at prescribed angular intervals in each set, and by angularly offsetting a plurality of sets by prescribed angles, a plurality of sets of rollers—when placed proximate to the entrance or exit to an aperture—can preclude radiation leakage through the aperture. The cable and the sets of rollers are, preferably, rotatable about the longitudinal axis of the cable. The rollers are adjustable to abut against cables of varying diameters, the axes of the rollers being substantially perpendicular to the cable axis, thereby allowing roller rotation during cable travel.

28 Claims, 4 Drawing Figures

APPARATUS FOR GUIDING CABLE THROUGH A RADIATION CHAMBER WITH REDUCED LEAKAGE THEREFROM

BACKGROUND OF THE INVENTION

In irradiating the insulation of cable with an electron or other beam, in order to affect the insulation or its properties in a desired manner, such cable is customarily passed into a shielded chamber which houses the beam. The cable travels longitudinally, entering the chamber at one aperture therein and exiting through a second aperture therein.

Normally, it is not desirable or safe to permit the radiation outside the chamber to exceed a certain level.

It is, therefore, important to prevent the greatest portion of radiation from escaping the chamber.

In addition, where cable is rotated as it passes through the chamber, it is also important that the cable be adequately supported to prevent catenary effects especially where the cable is struck by the beam.

SUMMARY OF THE INVENTION

The present invention relates to apparatus which guides a cable travelling longitudinally through an irradiation chamber and prevents radiation leakage via apertures through which the cable enters and exits the chamber. Both cable guidance and radiation leakage prevention are achieved by sets of rollers, each set including rollers disposed about the cable at angular intervals. The rollers abut the cable and are oriented so that they can rotate as the cable travels longitudinally, thereby providing guidance. The sets of rollers are positioned about the cable at the entrance to or exit from an aperture, blocking radiation that would otherwise pass from the chamber through an aperture. Accordingly, it is an object of the invention to dispose sets of rollers about a cable to both guide the cable and prevent leakage of radiation from a chamber through which the cable passes.

Further, it is a related object of the invention to define (a) the dimensions of the rollers, (b) the angular spacing between rollers in each set, and (c) the angular offset between rollers in various, preferably adjacent, sets so that an annular region is defined about the cable through which relatively few, if any, longitudinal paths of radiation can follow. Specifically, with proper roller dimensions, angular intervals, and angular offsets, the rollers of one set overlap rollers of at least one other set to form, when viewed from either aperture, an annular region coaxial therewith. When the annular region is proximate to or within the aperture, the leakage therethrough is greatly reduced.

In accordance with the invention, the cable can be rotated as it translates longitudinally and the sets of rollers can also rotate about the cable axis. The rotation of the sets is achieved, preferably, by coupling the sets of rollers to fixed length tubes that are coaxial with the cable. By rotating the tubes about their respective axes, the sets are also rotated. Accordingly, the rollers and cables can be rotated together to prevent damage to the insulation or outer skin of the cable as it travels longitudinally.

Also, according to the invention, the tubes (with sets coupled thereto) are rotatably mounted to stands which support the cable as it travels. The stands are positioned within the chamber at various longitudinally spaced locations. By placing the stands close together on either side of the location where the beam strikes the cable, any catenary effect resulting from rotating the cable about its axis is reduced at the beam location and greater cable rotation speeds can be achieved.

To accomodate cables of varying diameters, the rollers are adjustable radially inward and outward relative to the cable. The invention thus has as an object the guiding of different diameter cables while blocking radiation leakage.

DESCRIPTION OF THE DRAWINGS

FIG. 2 is a detailed view of the portion shown in FIG. 1 and identified as II.

DESCRIPTION OF THE INVENTION

Figure 1:
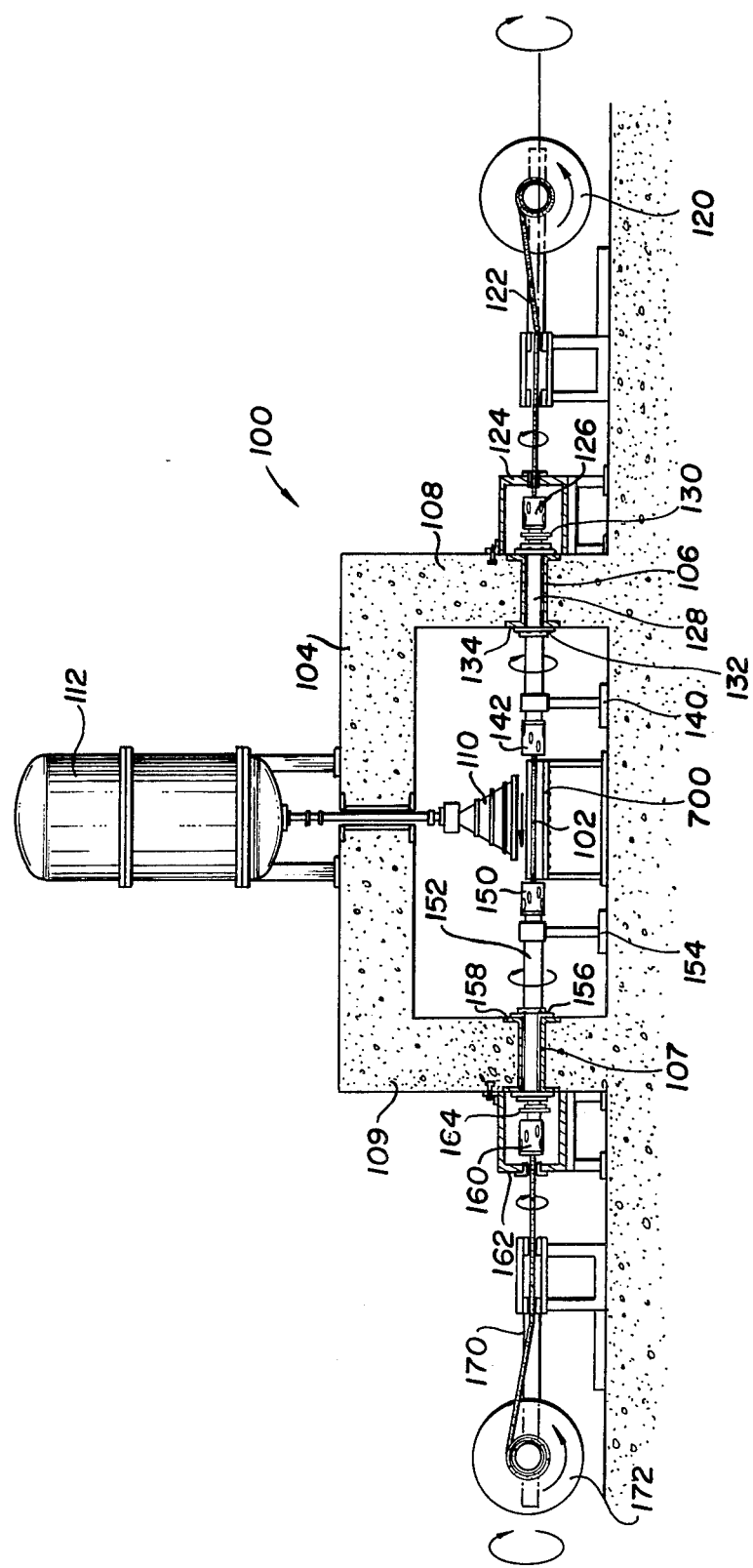
FIG. 1 is a front-view illustration of a system for irradiating cable which is rotated about its axis as it is drawn longitudinally through a shielded chamber.

FIG. 1 shows a system 100 for safely irradiating a cable 102 in shielded chamber 104. The chamber 104 has a given length and two elongated apertures 106 and 107 in the shielded chamber walls 108 and 109, respectively. A beam emanating from an electron scanning unit 110 intercepts a segment of the longitudinal path travelled by the cable 102. The electrons are generated by an accelerator 112 of known construction. The walls 108 and 109 depicted as concrete in FIG. 1 may alternatively comprise other compositions which also shield against electron beam irradiation or other irradiation used in processing the cable 102.

In following the path of the cable 102, it is observed that the cable 102 starts on a storage reel 120. The cable 102 passes through a pay-out device 122 from which the cable 102 enters a shielded compartment 124 which contains a first guidance and leakage prevention structure 126. The cable 102 passes through the first structure 126 and through a fixed length tube 128 which is coupled to the first structure 126. Also coupled to the tube 128 and the first structure 126 is a sprocket 130 that is coaxial with the tube 128 and the first structure 126. Sprocket 130 is driven by a chain 180 from an external source to insure that tube 128 rotates at the same speed as cable 102.

The tube 128 extends through the aperture 106. Encircling the tube 128 along the aperture 106 is a cylinder 134 affixed to the wall 108. The cylinder 134 is coupled to a conventional bearing assembly 132 into which the tube 128 is rotatably mounted.

The tube 128, which contains the cable 102, is supported by a stand 140 which is attached to the floor of the chamber 104. That is, the tube 128 is rotatably coupled, by bearings or the like, to the stand 140. The tube 128 extends into a second cable guidance and leakage prevention structure 142.

The cable 102 exits the second structure 142, passes under the electron beam, and enters a third cable guidance and leakage prevention structure 150. The cable 102 then passes through another fixed length tube 152 which is rotatably coupled to a stand 154 and rotatably mounted in the aperture 107 by a bearing assembly 156. The stands 140 and 154, it is noted, are close so that the catenary effect on the cable 102 as it rotates is greatly reduced.

The tube 152 is encircled by a stationary cylinder 158. Outside the wall 109 and connected to the tube 152 is a fourth cable guidance and leakage prevention structure 160 in a shielded compartment 162. The fourth structure 160 and tube 152 are rotatably drivable by a sprocket 164 that cooperates with a driven chain (not shown in FIG. 1).

The cable 102 then enters a conventional take-up device 170 and take-up reel 172.

The cable 102, it is noted, has wire extending its length surrounded by insulation which is affected by electrons impinging thereon. The insulation may be relatively thick, it is noted. Because the cable 102 rotates under the beam, the beam is able to uniformly penetrate such insulation. There are various known types of cable for which the present invention may be used and various types of radiation that may be applied, although an electron beam is preferred. Further, wire, tubing, pipe, or other such elements which can be paid out from and taken-up onto a reel may be equivalent substitutes for the cable being processed in the above discussion.

A further examination of FIG. 1 shows rotation arrows by the reels 120 and 172. In the system 100, the reels 120 and 172 can be rotated about their respective axes which are coaxial with the general longitudinal axis of the cable 102 travelling through the chamber 104. In that way, the cable 102 is rotated about its axis as it travels longitudinally. Preferably, as the cable 102 is rotated about its axis and translated longitudinally, the tubes 128 and 152 are rotated in synchrony with the rotation of the cable 102. Any insulation or outer skin on the cable 102 is thus engaged by the first structure 126, second structure 142, third structure 150 and fourth structure 160 which rotate in synchrony with the cable 102 about the axis of the cable 102. Thus, the insulation or skin is not adversely affected due to the rotation. The purpose of rotating the cable 102 is, it is noted, to expose differing portions of the cable periphery to the electron beam over time.

Figure 2:
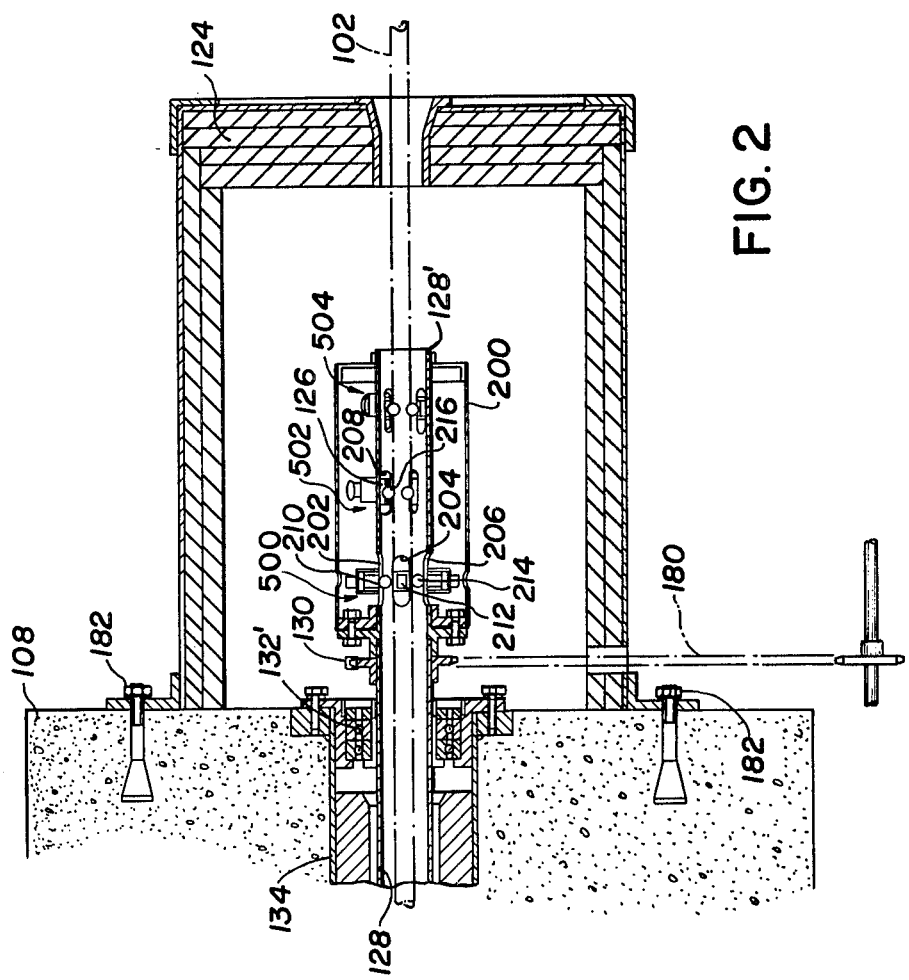
FIG. 2 is a front-view illustration of apparatus, according to the invention, which guides a cable through a shielded chamber and reduces radiation leakage from the chamber, the apparatus comprising sets of rollers.

Referring to FIG. 2, the first structure 126 driven by sprocket 130 (and chain 180) are shown in detail, housed within shielded compartment 124. The compartment 124 is anchored to the wall 108 with bolts 182 or the like. The tube 128 is shown rotatably mounted with respect to the cylinder 134 by the bearing assembly 132'. The tube 128 extends into the first structure 126 as a tube length 128' (which is either an integral extension or an affixedly coupled extension of the tube 128). Surrounding the tube length 128' is a cover 200 which is comprised of a conventional shielding material, such as lead or other conventional shielding compositions. Disposed along the tube length 128' are slits, such as slits 202 through 208. Movable radially inward and outward through each slit, such as slit 202 through 208, relative to the cable 102 is a roller 210 through 216, respectively. As seen in FIG. 2, if the cable 102 and tube 128 (and tube length 128') rotate about the cable axis, the rollers 210 through 216—which abut the cable 102—also rotate about the cable axis.

Figure 4:
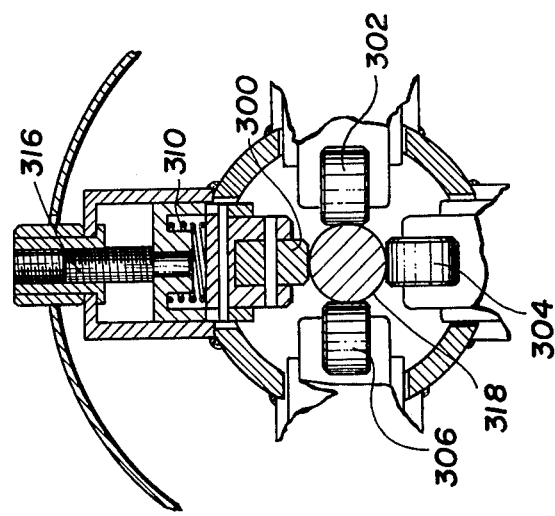
FIG. 4 is a side-view illustration of apparatus such as is shown in FIG. 2, the cable in FIG. 4 having a smaller diameter than the cable in FIG. 3.
Figure 3:
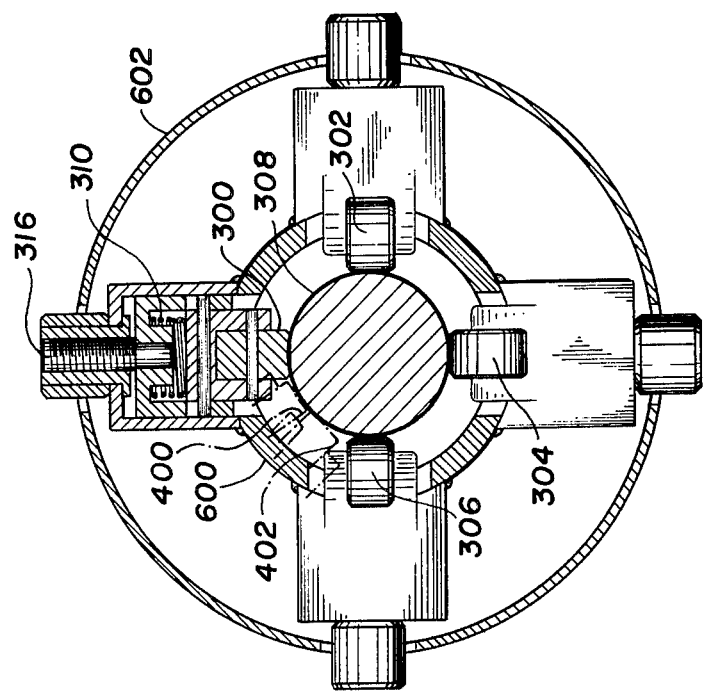
FIG. 3 is a side-view illustration of apparatus such as is shown in FIG. 2.

This is shown more clearly in FIGS. 3 and 4. In FIG. 3, four rollers 300 through 306 abut a cable 308 shown in cross-section. The cable 308 has a fairly large diameter. The rollers 300 through 306 are spring-loaded with mechanisms, such as mechanism 310, to engage the cable 308. Because of the spring-loading, the rollers 300 to 306 can, to some extent, accomodate cables 308 of varying diameters, smaller diameter cables having less engaging force applied thereto. In addition, for large diameter variations, an adjusting screw 316 is provided. In FIG. 3, with the screw 316 turned to one axial position, the rollers 300 through 306 provide a corresponding opening therein. In FIG. 4, the screw 316 is turned to another axial position, the rollers 300 through 306 thereby providing a smaller opening to accomodate cable 318 of smaller diameter. Cables of diameters ranging between $\frac{1}{4}''$ and $1\frac{1}{2}''$ are particularly amenable to processing according to this invention although other dimensions of cables may also be processed. Each roller 300 through 306, as suggested in FIG. 3, has a separate adjusting screw, although a single device for conjoint adjustment may be employed.

Still referring to FIG. 3, the angular sector between roller 300 and 306 is shown having two rollers 400 and 402 illustrated in phantom lines. Together rollers 300, 400, 402 and 306 form a 90° annular region about the cable 308 approximately equal to the diameter of each roller 300, 400, 402 and 306. With other rollers similarly interposed between the pairs of rollers 300, 302 and 302, 300, an entire annular region is defined about the cable axis which substantially blocks the passage of longitudinal or other linear radiation therethrough. That is, by orienting roller 400 an angle of 30° offset from roller 300 and by angularly offsetting the roller 402 60° relative to roller 300, the straight-line paths of radiation through the annular space between rollers 300 and 306 are substantially reduced. Moreover, were more rollers included between the rollers 300 and 306 in overlapping fashion, the leakage paths would be even further reduced.

Referring back to FIG. 2, the positioning of rollers 400 and 402 becomes clearer. Rollers 210 through 214 (and a fourth roller which is not visible) comprise a first set 500 of rollers. To the right thereof in FIG. 2 is roller 216 and three other rollers (not numbered) which comprise a second set 502. Spaced longitudinally to the right of the second set 502 is a third set of rollers 504. Each set 500 through 504 includes four rollers spaced at angular intervals about the cable axis, each roller in each set having an axis of rotation perpendicular to the cable axis. (This orientation, it is noted, may be skewed slightly without departing from the teachings of the invention in certain circumstances, such as when the tubes and cable do not rotate at the same speeds.) Preferably, but not necessarily, the rollers of each set 500 through 504 are spaced at equal angular intervals. In FIG. 2, the intervals are 90°. Also preferably, but not required, the rollers are all equal in dimensions. Still referring to FIG. 2, it can be seen that the rollers of the first set 500 (210 through 214 for example) are angularly offset relative to the rollers of the second set 502 and the third set 504. That is, if the rollers of the set 500 are considered positioned about the cable axis at the 0°, 90°, 180°, and 270° positions; the rollers of the third set are at positions 30°, 120°, 210°, and 300° while the rollers of the second set are at positions 60°, 150°, 240°, and 330°.

Reexamining FIG. 3, rollers 300 through 306 may be considered in the first set of rollers with roller 400 being in the second set and roller 402 being in the third set. Also evident in FIG. 3 is the fact that, with (a) rollers of a prescribed axial length, (b) a prescribed angular interval between rollers in each set, and (c) a prescribed offsetting of longitudinally spaced sets, a substantial reduction or elimination in leakage paths is achieved. In this regard, it is noted that by increasing the number of offset sets or by increasing the axial length of each roller, i.e. angle about the cable subtended by the roller, radiation blockage may be increased.

Encircling the rollers 300 through 306 and tube 600 is a shield cover 602 (like cover 200 of FIG. 2).

Referring again to FIG. 1, it is noted that each of the structures 126 and 160 are substantially similar in design. Structures 142 and 150 are also similar to structures 126 and 160, although there is an absence of a shield compartment and the structures 142 and 150 are within the chamber 104 whereas structures 126 and 160 are outside the chamber 104.

By placing structure 142 proximate to the entrance to the aperture 106 and by placing structure 126 proximate to the exit from aperture 106, the two structures 126 and 142 cooperate to reduce leakage. Additional structures of this kind disposed along the tube 128 would further enhance leakage reduction while also providing additional cable guidance. Specifically, with more structures and support stands, catenary effects resulting from cable rotation are diminished and cable rotation speeds of 50–200 rpm can be realized.

Each structure 126, 142, 150, and 160 includes an arrangement of sets of rollers, the sets in each arrangement being spaced longitudinally apart—preferably at equal spacings—with the rollers in each set being disposed about the cable axis at angular intervals which, again, are preferably equal. The various sets of each arrangement are angularly offset, the offsetting being defined so that one roller from at least one set lies along a large number of linear paths extending through an annular region about the cable 102.

For optimal operation, the aperture sizes are as small as possible and the clearance between the cylinders 134 and 158 and the respective tubes 128 and 152 are minimized. Also, the stands 140 and 154 are positioned proximate to where the beam intercepts the cable 102. Further, a cooler 700 is provided under the beam.

Although the above-noted certain conditions are preferred, the embodiment may be varied and remain within the scope of the invention.

It is further noted that materials used in the various components of the invention are well known. For example, the tubes, cylinders, covers, and chambers may be constructed of known shield-type materials.

Other improvements, modifications and embodiments will become apparent to one of ordinary skill in the art upon review of this disclosure. Such improvements, modifications and embodiments are considered to be within the scope of this invention as defined by the following claims.

I claim:

1. In a system having a shielded irradiation chamber with (a) a length and (b) two apertures at each end thereof through which cable to be irradiated can travel longitudinally, apparatus comprising:
   means for (a) preventing radiation leakage through the apertures and (b) guiding the cable;
   the leakage preventing the guiding means including, for each aperture, a plurality of rollers each of which abuts against the cable with the circumferential surface thereof, each roller being rotated about the respective axis thereof as the cable travels longitudinally, the axis of each roller being transverse to the direction of cable travel,
   the rollers forming a plurality of sets of rollers, each set including rollers disposed at angular intervals about the longitudinal axis of the cable, the sets being (a) longitudinally spaced along the path of the cable and (b) positioned to block radiation from exiting the chamber through the apertures;
   means for rotating the cable about the longitudinal axis thereof, the cable being rotatable as the cable travels longitudinally; and
   means for rotating the cable about the longitudinal axis thereof, the cable being rotatable as the cable travels longitudinally; and
   means for revolving each set of rollers about the longitudinal axis of the cable in synchrony with the rotation of the cable.

2. Apparatus according to claim 1 wherein the rollers in one set are angularly offset about said longitudinal axis of the cable relative to the rollers of at least one other set, such that rollers of at least one set are not longitudinally aligned with the rollers of at least one other set.

3. Apparatus according to claim 2 wherein the rollers are all similarly dimensioned.

4. Apparatus according to claim 3 wherein
   (a) the axial length of each roller,
   (b) the angular intervals between rollers in each set, and
   (c) the angular offset of the rollers in each set relative to the rollers of the other sets are defined to limit linear exit paths for radiation through either aperture in an annular region extending radially outward from the cable.

5. Apparatus according to claim 4 further comprising:
   means for forming the sets into arrangements of sets, each arrangement comprising a plurality of sets spaced at longitudinal intervals, the rollers of each set in each arrangement being angularly offset about the longitudinal axis of the cable relative to at least one other set in said each arrangement.

6. Apparatus according to claim 5 wherein the annular region extends outward from the cable a distance substantially equal to a roller diameter.

7. Apparatus according to claim 3 wherein each set comprises rollers spaced at equal angular intervals.

8. Apparatus according to claim 5 wherein each set comprises four rollers spaced at 90° angular intervals.

9. Apparatus according to claim 8 wherein the plurality of sets in each arrangement of sets comprises three sets, the rollers of a first set being angularly offset (a) 30° from the rollers of a second set and (b) 60° from the rollers of a third set.

10. Apparatus according to claim 4 further comprising:
    a plurality of stationary stands, at least one stand being positioned within the chamber proximate to one aperture and at least one stand being positioned within the chamber proximate to the other aperture; and
    means for rotatably coupling each arrangement of sets to a stationary stand.

11. Apparatus according to claim 10 wherein the rotatable coupling means comprises:
    at least one fixed length tube disposed about the longitudinal axis of the cable;
    means for connecting each arrangement of sets to a corresponding fixed length of tube; and means for rotatably mounting each fixed length tube to a respective stationary stand, each fixed length tube being rotatable about the axis thereof;

the arrangement rotating means comprising means for rotating the fixed length tubes.

12. Apparatus according to claim 11 wherein the at least one fixed length tube comprises two fixed length tubes each of which extends through a respective aperture;

each tube being rotatably mounted within the respective aperture.

13. Apparatus according to claim 12 wherein the connecting means includes:

means for affixing to each fixed length tube at the end thereof which is within the chamber an arrangement of sets.

14. Apparatus according to claim 13 wherein the connecting means includes:

means for affixing to each fixed length tube at the end thereof which is outside the chamber an arrangement of sets.

15. Apparatus according to claim 13 wherein the system includes a beam of radiation within the chamber that strikes a segment along the cable path; and wherein the segment of the cable path struck by the beam lies between (a) the arrangement of sets affixed to the end within the chamber of the fixed length tube extending through one of the apertures and (b) the arrangement of sets affixed to the end within the chamber of the fixed length tube extending through the other aperture.

16. Apparatus according to claim 15 wherein each set comprises rollers spaced at equal angular intervals.

17. Apparatus according to claim 15 wherein each set comprises four rollers spaced at 90° angular intervals.

18. Apparatus according to claim 1 or 4 or 20 wherein the rollers are radially adjustable relative to the cable, the diameter of the cable travelling through the sets of rollers being thereby variable.

19. Apparatus according to claim 18 wherein the rollers are spring-loaded.

20. Apparatus according to claim 5 or 11 further comprising:

cover structure for surrounding each arrangement with radiation shielding material.

21. Apparatus according to claim 15 wherein an arrangement is coupled to a first stand and an arrangement is coupled to a second stand; and wherein the first stand arrangement and second stand arrangement are each proximate to and are positioned with the segment of the cable struck by the beam there-between.

22. Apparatus for transporting an elongated, cylindrical object of indefinite length through a processing area in a chamber, the elongated object entering the chamber through an entrance aperture therein and exiting the chamber through an exit aperture therein, the apparatus comprising:

means for conveying the elongated object in a direction along the longitudinal axis thereof through the chamber;

means for rotating the elongated object about the longitudinal axis thereof, said conveying means and rotating means being operable to effectuate longitudinal conveyance and rotation of the elongated object simultaneously; and means for guiding the elongated object through the chamber;

said guiding means comprising:

a plurality of sets of rollers spaced along the path of the elongated object to support the elongated object within the chamber;

the rollers of each set being (a) spaced at angular intervals about the path of the elongated object and (b) positionable to engage the elongated object therebetween;

wherein the respective axis of each roller in a set of rollers that engage the elongated object therebetween is oriented so that said each roller engaging the elongated object rotates in response to the conveying of the elongated object;

said guiding means further including:

means for revolving each set of rollers about the path of the elongated object in synchrony with the rotation of the elongated object by said object rotating means;

a first tube dimensioned to encircle the elongated object and coupled to at least one set of rollers positioned before the processing area along the path of the elongated object; and a second tube dimensioned to encircle the elongated object and coupled to at least one set of rollers positioned after the processing area along the path of the elongated object; and wherein said first tube rotates about and said sets of rollers coupled thereto revolve about the longitudinal axis of the elongated object in synchrony; and wherein second tube rotates about and said sets of rollers coupled thereto revolve about the longitudinal axis of the elongated object in synchrony; and wherein said first tube extends through and is rotatably mounted in the entrance aperture of the chamber and wherein said second tube extends through and is rotatably mounted in the exit aperture of the chamber.

23. An apparatus according to claim 22 wherein the guiding means further comprises:

means for radially adjusting the position of the rollers in each set to selectively increase or decrease the opening therebetween, said adjusting means enabling elongated objects of diameters in a given range to be engaged therebetween.

24. An apparatus according to claim 22 wherein the apparatus further comprises:

first means for supporting at least one set of rollers proximate to and before the processing area; and second means for supporting at least one set of rollers proximate to and after the processing area;

said sets of rollers supported by said first means and said second means comprising means for limiting catenary effects on the elongated object in the processing area as the elongated object is simultaneously conveyed therethrough and rotated.

25. An apparatus according to claim 23 wherein the apparatus further comprises:

first means for supporting at least one set of rollers proximate to and before the processing area; and second means for supporting at least one set of rollers proximate to and after the processing area;

said sets of rollers supported by said first means and said second means comprising means for limiting catenary effects on the elongated object in the processing area as the elongated object is simultaneously conveyed therethrough and rotated.

26. An apparatus according to claim 22 wherein said guiding means further comprises:

spring means for urging the rollers in each set radially inwardly against the elongated object when engaged therebetween.

27. An apparatus according to claim 23 wherein said guiding means further comprises:
spring means for urging the rollers in each set radially inwardly against the elongated object when engaged therebetween.

28. An apparatus according to claim 22 wherein the rollers in each set are spaced at equal angular intervals.

* * * * *